United States Patent
Heo et al.

(10) Patent No.: US 8,461,798 B2
(45) Date of Patent: Jun. 11, 2013

(54) APPARATUS AND METHOD FOR EXTRACTING MAXIMUM POWER FROM SOLAR CELL BY CHANGING THE DUTY CYCLE OF A PULSE WIDTH MODULATION SIGNAL

(75) Inventors: Se Wan Heo, Daejeon (KR); Yil Suk Yang, Daejeon (KR); Jae Woo Lee, Daejeon (KR); Moon Gyu Jang, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/878,443

(22) Filed: Sep. 9, 2010

(65) Prior Publication Data

US 2011/0140680 A1    Jun. 16, 2011

(30) Foreign Application Priority Data

Dec. 11, 2009   (KR) .................. 10-2009-0122964

(51) Int. Cl.
*H02J 7/00* (2006.01)

(52) U.S. Cl.
USPC ................ 320/101; 320/145; 323/906

(58) Field of Classification Search
USPC .......... 320/101, 139, 140, 141, 145; 323/299, 323/300, 906
See application file for complete search history.

(56) References Cited

U.S. PATENT DOCUMENTS

| | | | |
|---|---|---|---|
| 4,899,269 A * | 2/1990 | Rouzies | 363/41 |
| 5,932,994 A * | 8/1999 | Jo et al. | 323/222 |
| 6,586,906 B1 * | 7/2003 | Bessa et al. | 320/101 |
| 6,984,970 B2 * | 1/2006 | Capel | 323/299 |
| 7,045,991 B2 * | 5/2006 | Nakamura et al. | 322/28 |
| 7,053,506 B2 * | 5/2006 | Alonso et al. | 307/126 |
| 7,952,897 B2 * | 5/2011 | Nocentini et al. | 363/41 |
| 8,174,281 B2 * | 5/2012 | Tseng et al. | 324/761.01 |
| 8,227,683 B2 * | 7/2012 | Glaser et al. | 136/244 |
| 8,304,932 B2 * | 11/2012 | Ledenev et al. | 307/82 |
| 2005/0099166 A1 * | 5/2005 | Alonso et al. | 323/282 |
| 2005/0110454 A1 * | 5/2005 | Tsai et al. | 320/101 |
| 2010/0102773 A1 * | 4/2010 | Lipcsei | 320/101 |
| 2011/0031925 A1 * | 2/2011 | Simburger et al. | 320/101 |
| 2011/0273130 A1 * | 11/2011 | Lee et al. | 320/101 |

FOREIGN PATENT DOCUMENTS

| | | |
|---|---|---|
| JP | 06-117678 A | 4/1994 |
| KR | 1020000025822 A | 5/2000 |
| KR | 1020040058151 A | 7/2004 |
| KR | 1020060087822 A | 8/2006 |
| KR | 1020070070685 A | 7/2007 |

* cited by examiner

Primary Examiner — Edward Tso
Assistant Examiner — Manuel Hernandez
(74) Attorney, Agent, or Firm — H.C. Park & Associates, PLC

(57) ABSTRACT

An apparatus and method for extracting maximum power from a solar cell are provided. The apparatus includes a solar cell for producing power from solar energy, a maximum power extractor for generating a pulse width modulation signal for extracting the maximum power from the solar cell, and a DC-DC converter for adjusting an amount of current generated from the solar cell according to the pulse width modulation signal.

16 Claims, 3 Drawing Sheets

Duty = a/p

APPARATUS AND METHOD FOR EXTRACTING MAXIMUM POWER FROM SOLAR CELL BY CHANGING THE DUTY CYCLE OF A PULSE WIDTH MODULATION SIGNAL

CROSS-REFERENCE TO RELATED APPLICATION

This application claims priority to and the benefit of Korean Patent Application No. 10-2009-0122964, filed Dec. 11, 2009, the disclosure of which is incorporated herein by reference in its entirety.

BACKGROUND

1. Field of the Invention

The present invention relates to extraction of power from a solar cell, and an apparatus and method for obtaining maximum power from the solar cell. More specifically, the present invention relates to an apparatus and method capable of extracting maximum power from a solar cell using a simple circuit by effectively extracting power without a complex circuit or component.

2. Discussion of Related Art

Solar energy is an energy source that is not artificially produced energy but can be obtained from nature. Among non-polluting energy sources, solar energy is the most noticeable as a next-generation energy source, and related technology is being actively developed. A solar cell capable of obtaining solar energy is a device for receiving energy from the sun and producing power. An amount of the produced power varies with an angle or amount of solar light and a temperature of the solar light.

Unlike a typical cell, a solar cell exhibits a nonlinear current-voltage curve. Accordingly, it is necessary to find a maximum power point and extract power in order to derive maximum power.

There are several conventional techniques for extracting maximum power. In a first method, a property of a solar cell is recognized in advance to find a relationship between voltage and current, and voltage and current for maximum power are induced from a measured voltage and current, based on the relationship. This first method has a problem in that the property must be recognized in advance and stored in the form of a look-up table. In a second method, a change of voltage and current, and therefore also power, is detected to obtain higher power using an operation unit. This second method has high accuracy, but requires additional components, such as the operation unit capable of performing various operations including multiplication.

Such methods require a number of additional components, such as an operation unit and a storage device.

SUMMARY OF THE INVENTION

The present invention is directed to an apparatus and method capable of extracting maximum power from a solar cell that can be simply manufactured due to a reduced number of additional components and readily used.

One aspect of the present invention provides an apparatus for extracting maximum power from a solar cell, including: a solar cell for producing power from solar energy; a maximum power extractor for generating a pulse width modulation signal for extracting the maximum power from the solar cell; and a DC-DC converter for adjusting an amount of current generated from the solar cell according to the pulse width modulation signal.

The maximum power extractor may change an amount of voltage generated from the solar cell and the amount of the current generated from the solar cell, compare the voltage having the changed amount with the current having the changed amount, and adjust a ratio of on-time to period of the pulse width modulation signal according to the result of the comparison. The DC-DC converter may adjust the amount of the current generated from the solar cell according to the ratio of on-time to period of the pulse width modulation signal. The maximum power extractor may include: a voltage/current detector for detecting the voltage generated from the solar cell and the current generated from the solar cell; a voltage/current increasing/decreasing unit for increasing or decreasing the amounts of the detected voltage and the detected current; a voltage/current comparator for comparing the voltage having the increased or decreased amount with the current having the increased or decreased amount; and a pulse width modulator for generating the pulse width modulation signal capable of controlling an amount of power extracted from the solar cell. The pulse width modulator may receive a reference signal for the pulse width modulation signal and an output of the voltage/current comparator to determine the ratio of on-time to period of the pulse width modulation signal, and generate the pulse width modulation signal. The voltage/current detector may measure a voltage at an output terminal of the solar cell to detect the voltage generated from the solar cell, and detect the current generated from the solar cell based on a voltage across a resistor connected between the solar cell and the DC-DC converter. The maximum power extractor may adjust the ratio of on-time to period of the pulse width modulation signal so that a constant ratio of the current generated from the solar cell to a value obtained by subtracting a specific value from the voltage generated from the solar cell is maintained.

Another aspect of the present invention provides a method of extracting maximum power from a solar cell, including: detecting voltage and current generated from the solar cell which produces power from solar energy; increasing or decreasing amounts of the detected voltage and current; comparing the voltage having the increased or decreased amount with the current having the increased or decreased amount; generating a pulse width modulation signal capable of controlling an amount of power extracted from the solar cell; adjusting the amount of the current generated from the solar cell according to the pulse width modulation signal; and using the power.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like components throughout the description of the drawings.

Figure 1:
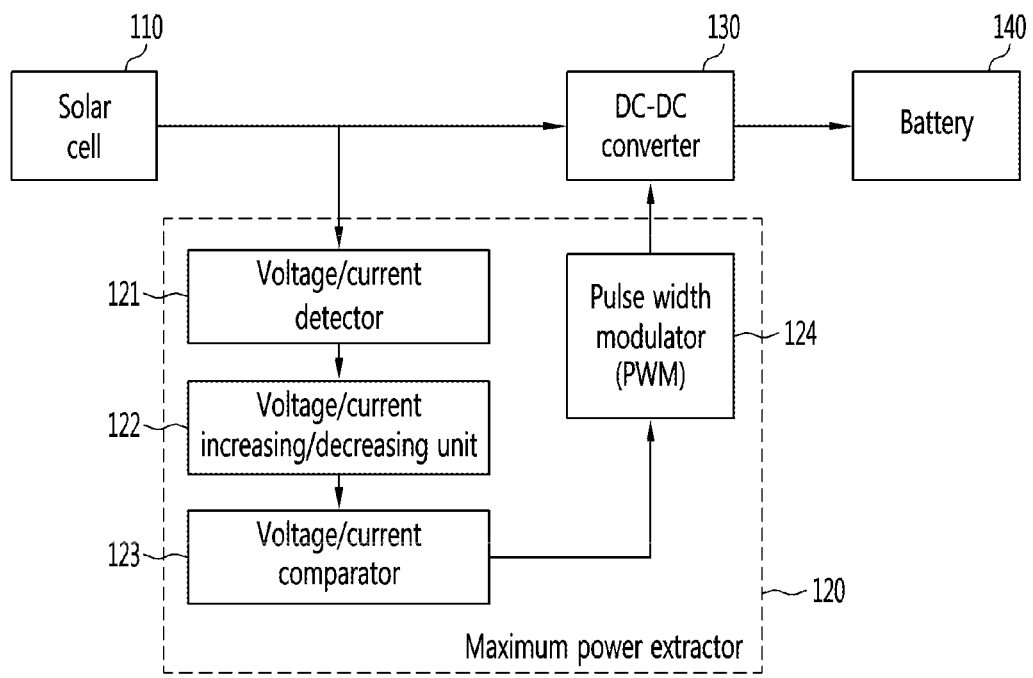
FIG. 1 is a block diagram of a system for extracting maximum power from a solar cell according to an exemplary embodiment of the present invention.

FIG. 1 is a block diagram of a system for extracting maximum power from a solar cell according to an exemplary embodiment of the present invention. The system for extracting maximum power from a solar cell according to an exemplary embodiment of the present invention includes a solar cell 110 for producing power from solar energy, a maximum power extractor 120 for generating a pulse width modulation signal to extract maximum power from the solar cell 110, a DC-DC converter 130 for adjusting an amount of voltage output from the solar cell 110 and an amount of extracted power by adjusting an amount of the current output from the solar cell 110 according to the pulse width modulation signal, and a battery 140 for storing power so that the power is available.

The solar cell 110 produces the power from the solar energy and delivers the power to the DC-DC converter 130. The voltage and the current output from the solar cell 110 have a nonlinear relationship depending on a property of the solar cell 110. Power is a product of voltage and current. It is difficult to find maximum power because when the voltage output from the solar cell 110 is changed, the current is accordingly changed, and when the current is changed, the voltage is accordingly changed. According to an exemplary embodiment of the present invention, the maximum power can be schematically found using a simple method.

The maximum power extractor 120 includes a voltage/current detector 121 for detecting the voltage and current output from the solar cell 110, a voltage/current increasing/decreasing unit 122 for adjusting the amounts of the voltage and the current and increasing or decreasing the amounts by a desired multiple for equalized comparison, a voltage/current comparator 123 for comparing the voltage having the increased or decreased amount with the current having the increased or decreased amount to determine which one of the voltage and the current is greater and how great the voltage or the current is, and a pulse width modulator 124 for generating a pulse width modulation signal to determine how to control the power from the solar cell using the ratio of on-time to period (i.e., a duty cycle).

When the current increases in a state in which setup is completed for extraction of the maximum power, the voltage decreases more than the current, such that the power is reduced. When the power point deviates from a maximum power point, the pulse width modulation signal is changed through comparison between the amounts of the voltage and the current and the current output from the solar cell is adjusted by the DC-DC converter 130, thus maintaining the maximum power point.

The DC-DC converter 130 performs voltage conversion to store the power from the solar cell in the battery. For the voltage conversion, a switching mode in which on/off switching of a transistor is controlled by a pulse width modulation signal is used. Specifically, the DC-DC converter 130 controls switching of the transistor according to the ratio of on-time to period of the pulse width modulation signal (i.e., a duty cycle). Current flows for a switching-on time. Accordingly, the amount of the current generated from the solar cell can be adjusted by the size of the duty cycle.

Figure 2A:
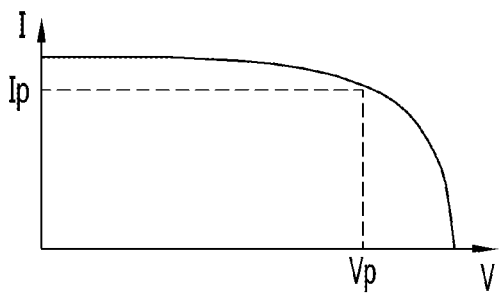
FIGS. 2a and 2b are graphs showing a current-voltage curve, in which the current and voltage are generated from a solar cell, and a power-voltage curve.
Figure 2B:
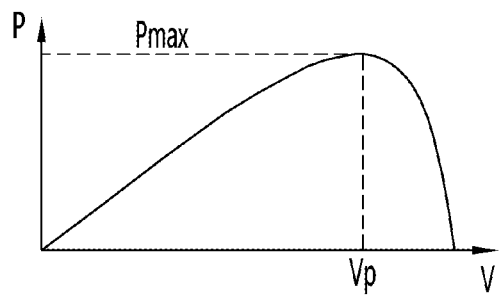

FIGS. 2a and 2b are graphs showing a current-voltage curve, in which the current and voltage are generated from a solar cell, and a power-voltage curve. In particular, the power-voltage curve and maximum power are shown in FIG. 2b. The two curves show a property of the solar cell in which only the current and the voltage are changed under the same condition. When more current flows from the solar cell, the voltage decreases, and when less current flows, the voltage increases, such that the power varies with the state of the voltage and current. In an exemplary embodiment of the present invention, maximum power Pmax is extracted at a maximum power point (Vp, Ip) at which the power is maximal.

Figure 3:
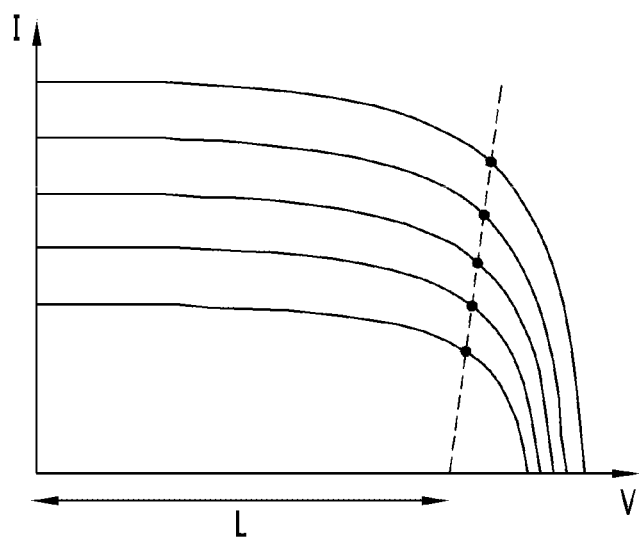
FIG. 3 is a graph showing a change of a maximum power point with an intensity of solar light.

FIG. 3 is a graph showing a change of a maximum power point with an intensity of solar light. In FIG. 3, the maximum power point for the solar cell 110 is changed with a condition. As the solar light intensity becomes stronger, the voltage and the current simultaneously increase and as the solar light intensity becomes weaker, the voltage and the current simultaneously decrease. Since the maximum power point is changed with the condition, the maximum power point satisfying the condition must be found.

In an exemplary embodiment of the present invention, it is assumed that a maximum power point is changed linearly with the intensity of the solar light, in order to find a maximum power point independent from the change of the solar light. If maximum power points dependent on the solar light change are assumed to be on one straight line and a voltage at a point at which the straight line meets a voltage (V)-axis is defined as L, a graph of current and voltage-L can be obtained.

Figure 4A:
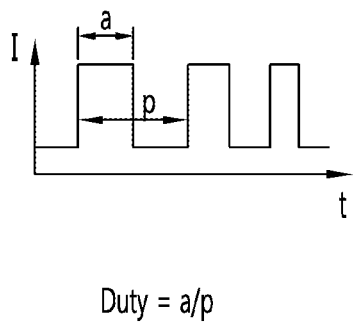
FIGS. 4a and 4b are graphs showing the ratio of on-time to period (i.e., a duty cycle) of a signal for maximum power extraction, and a power point dependent on the duty cycle.
Figure 4B:
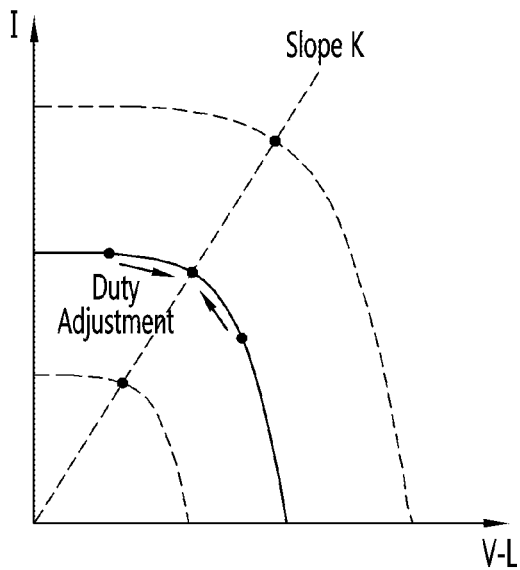

FIG. 4a is a graph showing the ratio of on-time to period (i.e., a duty cycle) of a signal for extraction of maximum power, and FIG. 4b is a graph of a current and voltage-L showing that a power point moves to a maximum power point by changing the duty cycle. The duty cycle is the ratio of an on-time (a) to a period (p) of a pulse width modulation signal. When the duty cycle is great, more current is output from the solar cell 110, and when the duty cycle is small, less current is output from the solar cell 110. Accordingly, the power point on the current-voltage curve can be changed by changing the duty cycle. Even when the voltage and the current are changed temporarily, the power point can be moved to the maximum power point by adjusting the duty cycle.

Figure 5:
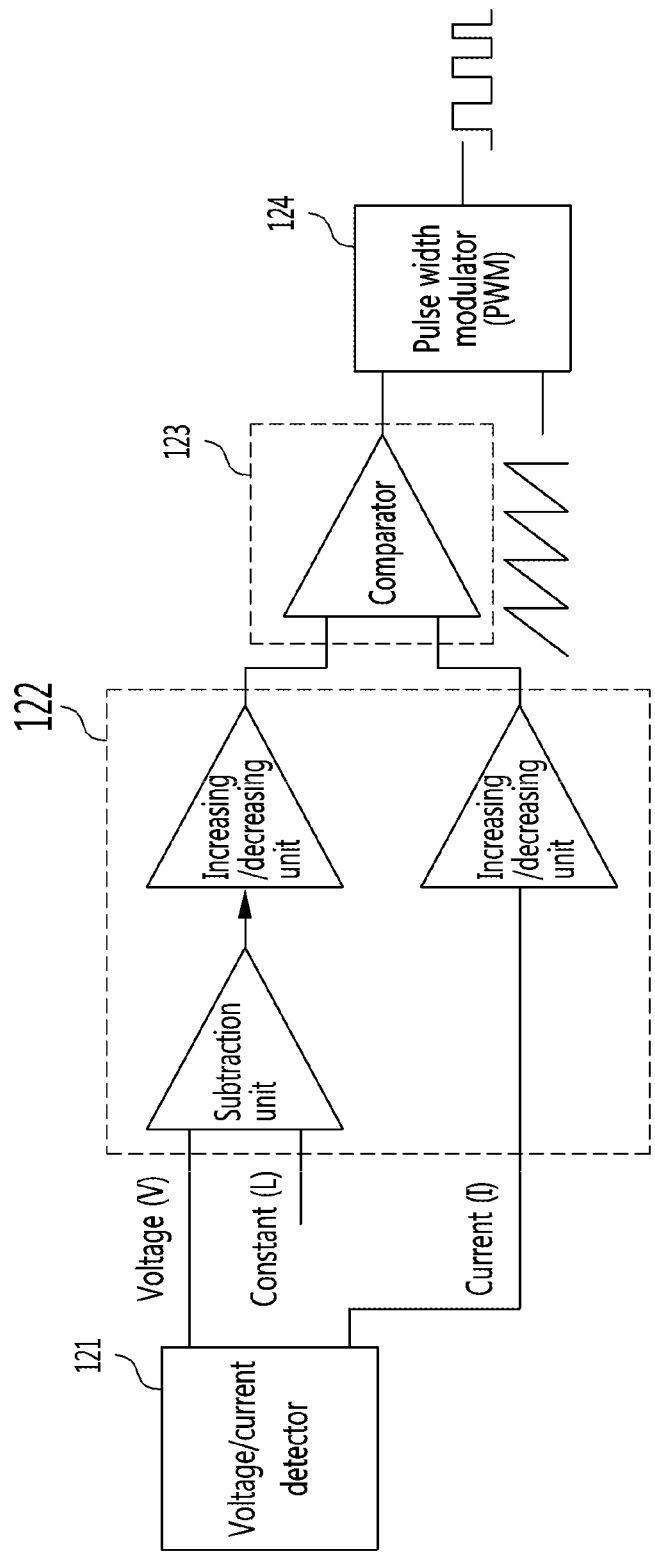
FIG. 5 is a block diagram of a maximum power extractor for pulse width modulation according to an exemplary embodiment of the present invention.

FIG. 5 is a block diagram of the maximum power extractor 120 for pulse width modulation according to an exemplary embodiment of the present invention. Even when the voltage and the current output from the solar cell 110 are temporarily changed, the maximum power extractor 120 changes the duty cycle of the pulse width modulation signal so that the voltage and current return to voltage and current at the maximum power point. Specifically, the maximum power extractor 120 controls generation of the pulse width modulation signal so that a value obtained by subtracting a specific value from the voltage and the current are maintained at a constant ratio.

The pulse width modulation signal controls on/off switching of the switching of the transistor of the DC-DC converter 130. A pulse width modulation signal having a large duty cycle increases an on-time of the transistor so that more current is generated from the solar cell 110. On the other hand, a pulse width modulation signal having a small duty cycle increases an off-time of the transistor so that less current is generated from the solar cell 110. Accordingly, the pulse width modulator determines the duty cycle to change the voltage and current from the solar cell 110. In an exemplary embodiment, when the current temporarily increases and the voltage temporarily decreases according to a current-voltage property of the solar cell 110, the comparator 123 of the maximum power extractor 120 senses that an amount of the current is higher than the voltage, and the pulse width modulator decreases the duty cycle, such that the current amount decreases to move toward the maximum power point.

If the voltage and the current output from the solar cell 110 are defined as V and I and a constant value is defined as L, the maximum power extractor 120 maintains a constant ratio of I to V−L.

In an exemplary embodiment, the voltage/current detector 121 measures a voltage at an output terminal of the solar cell 110 to detect the voltage output from the solar cell 110. The voltage/current detector 121 also detects the current output from the solar cell 110 based on the voltage across a resistor connected between the solar cell and the DC-DC converter 130.

Referring to FIG. 5, a value obtained by increasing or decreasing an amount of the detected current (B times) is compared with a value obtained by increasing or decreasing V−L (A times), and the duty cycle is determined based on a difference of the two values by the pulse width modulator. The duty cycle (D) is determined using the following equation:

$$D=PWM(A(V-L)-BI)$$

In order to maintain a constant duty cycle corresponding to the maximum power point, an input signal of the pulse width modulator (PWM) must be maintained at a constant value. If the value D is defined as 0, the following equation is obtained:

$$A(V-L)-BI=0 => I=K(V-L)(K=AB; \text{slope})$$

That is, referring to FIG. 3, when A and B are determined from the current I and the difference (V−L) between the voltage and the constant value at the maximum power point under a specific condition of the solar cell, the power point is always moved to the maximum power point for stability.

In addition, even when I and V−L simultaneously increase or decrease along the slope K, the equation is satisfied and the maximum power point is maintained. In an exemplary embodiment, even when the current-voltage curve is changed as the current and the voltage simultaneously increase due to an increased light amount of the solar cell or simultaneously decrease due to a decreased light amount, the power point is moved to a changed maximum power point along the slope K, as shown in FIG. 4b.

Thus, the present invention provides a method for moving the power point to the maximum power point through duty cycle control by the maximum power extractor even when the current and voltage from the solar cell are changed, and an apparatus for maintaining the maximum power point irrespective of the change of the solar light intensity.

A method of extracting maximum power according to an exemplary embodiment of the present invention will now be described.

Referring to FIGS. 1 and 5, first, voltage and current output from the solar cell 110, which produces power from solar energy, are detected. The detection may be performed by the voltage/current detector 121 of the maximum power extractor 120. The voltage output from the solar cell 110 is detected by measuring a voltage at an output terminal of the solar cell 110, and the current output from the solar cell 110 is detected based on a voltage across a resistor connected between the solar cell 110 and the DC-DC converter 130, which adjusts the amount of the current generated from the solar cell.

The amounts of the detected voltage and current are then increased or decreased. This may be performed by the voltage/current increasing/decreasing unit 122.

The voltage/current comparator 123 compares the voltage having the increased or decreased amount to the current having the increased or decreased amount.

The pulse width modulator 124 generates a pulse width modulation signal for controlling the amount of the power extracted from the solar cell. In particular, the pulse width signal has the ratio of on-time to period adjusted according to the result of comparing voltage having the increased or decreased amount with current having the increased or decreased amount.

The DC-DC converter 130 adjusts the amount of the current generated from the solar cell according to the pulse width modulation signal. In particular, the DC-DC converter 130 adjusts the amount of the current generated from the solar cell according to the ratio of on-time to period of the pulse width modulation signal.

The battery 140 stores the power.

In particular, the method of extracting maximum power according to the present exemplary embodiment is characterized by adjustment of the ratio of on-time to period of the pulse width modulation signal in order to maintain the ratio (I/(V−L)) of the current I generated from the solar cell to a value V−L obtained by subtracting a specific value L from the voltage V generated from the solar cell, at a constant ratio K.

The present invention relates to a system for extracting power from a solar cell and provides an apparatus for extracting power without a complex circuit or component. Also, the apparatus extracts maximum power irrespective of a condition of the solar cell, and thus does not require a separate device for obtaining a condition for generation of the maximum power from the solar cell.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for extracting a maximum power from a solar cell, the apparatus comprising:
   a solar cell configured to produce power from solar energy;
   a maximum power extractor configured to generate a pulse width modulation signal to extract the maximum power from the solar cell; and
   a DC-DC converter configured to adjust an amount of a current generated from the solar cell according to the pulse width modulation signal,
   wherein the maximum power extractor is configured to detect a voltage generated from the solar cell and the current generated from the solar cell, change an amount of the detected voltage and an amount of the detected current generated from the solar cell to provide an equalized comparison basis for an equalized voltage value and an equalized current value, compare the equalized voltage value with the equalized current value to generate the pulse width modulation signal, and adjust a ratio of an on-time to a period of the pulse width modulation signal according to a result of the comparison.

2. The apparatus of claim 1, wherein the DC-DC converter adjusts the amount of the current generated from the solar cell according to the ratio of the on-time to the period of the pulse width modulation signal.

3. The apparatus of claim 1, wherein the maximum power extractor comprises:
   a voltage/current detector configured to detect the voltage generated from the solar cell and the current generated from the solar cell;
   a voltage/current increasing/decreasing unit configured to increase or decrease the amount of the detected voltage and the amount of the detected current to provide the equalized voltage value and the equalized current value, respectively;
   a voltage/current comparator configured to compare the equalized voltage value with the equalized current value; and
   a pulse width modulator configured to generate the pulse width modulation signal capable of controlling an amount of power extracted from the solar cell.

4. The apparatus of claim 3, wherein the pulse width modulator receives a reference signal and an output of the voltage/current comparator to determine the ratio of the on-time to the period of the pulse width modulation signal, and generates the pulse width modulation signal.

5. The apparatus of claim 3, wherein the voltage/current detector measures a voltage at an output terminal of the solar cell to detect the voltage generated from the solar cell, and detects the current generated from the solar cell based on a voltage across a resistor connected between the solar cell and the DC-DC converter.

6. The apparatus of claim 1, wherein the maximum power extractor adjusts the ratio of the on-time to the period of the pulse width modulation signal so that a constant ratio of the current generated from the solar cell to a value obtained by subtracting a specific value from the voltage generated from the solar cell is maintained.

7. The apparatus of claim 1, further comprising a battery for storing the power from solar energy.

8. A method of extracting maximum power from a solar cell, the method comprising:
   detecting a voltage and a current generated from the solar cell which produces power from solar energy;
   increasing or decreasing amounts of the detected voltage and the detected current to provide an equalized comparison basis for an equalized voltage value and an equalized current value;
   comparing the equalized voltage value with the equalized current value;
   generating a pulse width modulation signal based on the comparing of the equalized voltage value with the equalized current value, the pulse width modulation signal being capable of controlling an amount of power extracted from the solar cell; and
   adjusting an amount of the current generated from the solar cell according to the pulse width modulation signal.

9. The method of claim 8, wherein a ratio of an on-time to a period of the pulse width modulation signal is adjusted according to a result of the comparison.

10. The method of claim 9, wherein adjusting the amount of the current generated from the solar cell comprises adjusting the amount of the current generated from the solar cell according to the ratio of the on-time to the period of the pulse width modulation signal.

11. The method of claim 8, wherein the voltage generated from the solar cell is detected by measuring a voltage at an output terminal of the solar cell, and the current generated from the solar cell is detected based on a voltage across a resistor connected between the solar cell and a unit for adjusting the amount of the current generated from the solar cell.

12. The method of claim 8, wherein a ratio of an on-time to a period of the pulse width modulation signal is adjusted so that a constant ratio of the current generated from the solar cell to a value obtained by subtracting a specific value from the voltage generated from the solar cell is maintained.

13. A method of extracting a maximum power from a solar cell, the method comprising:
   detecting an output voltage and an output current of the solar cell; and
   adjusting a signal to control an amount of power extracted from the solar cell, thereby maintaining a ratio of the output current to a first value obtained by subtracting a first voltage from the output voltage at a constant value.

14. The method of claim 13, wherein the first voltage is a constant voltage.

15. The method of claim 14, wherein adjusting the signal comprises adjusting a ratio of an on-time to a period of a pulse width modulation signal.

16. The method of claim 15, further comprising comparing a second value obtained by increasing or decreasing the output current with a third value obtained by increasing or decreasing the first value obtained by subtracting the first voltage from the output voltage,
   wherein the ratio of the on-time to the period of the pulse width modulation signal is adjusted according to the comparison.

* * * * *